Dec. 18, 1928.
A. C. HOFSTEE
1,695,763
APPARATUS FOR MACHINING POLYGONAL PARTS ON ORDINARY LATHES
Filed March 12, 1925
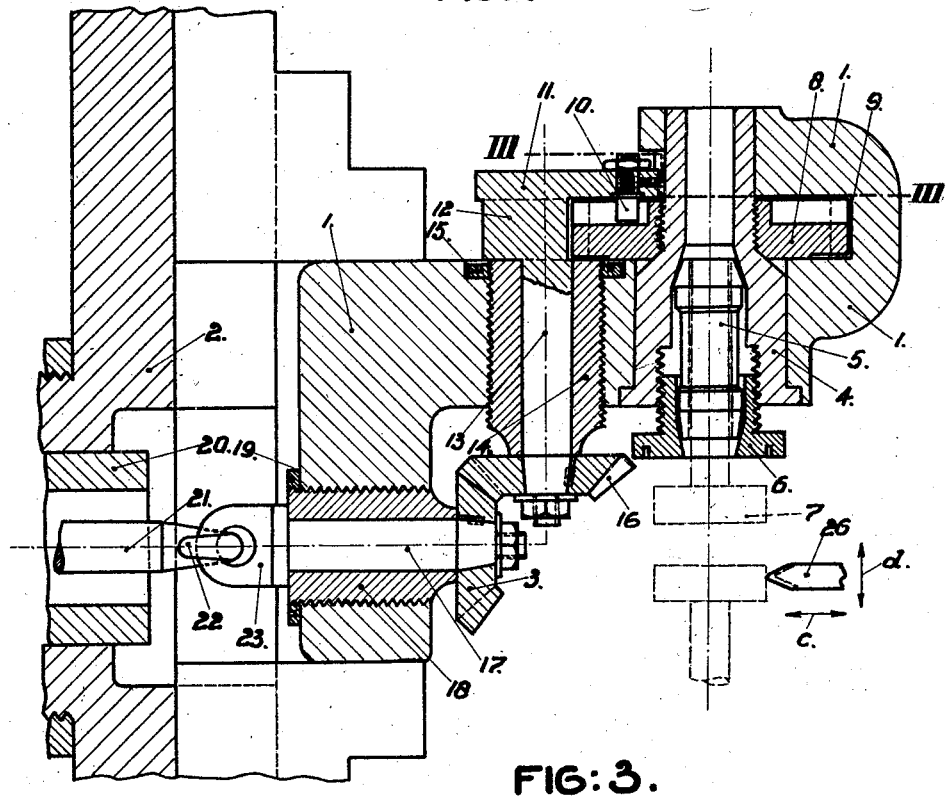
FIG: 1.
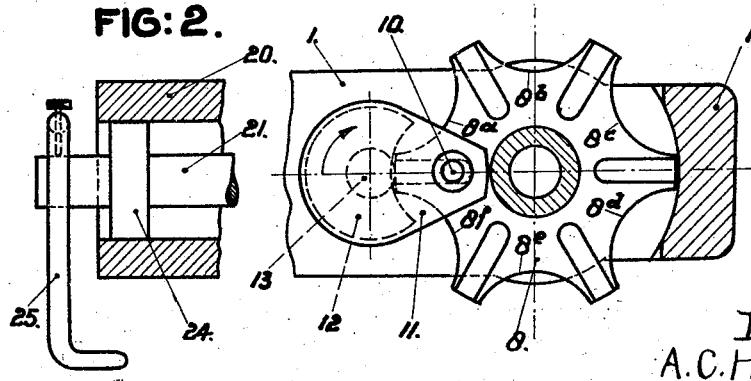
FIG: 2.   FIG: 3.
Inventor
A. C. Hofstee
By
Markss Clark
Attys Patented Dec. 18, 1928.

1,695,763

UNITED STATES PATENT OFFICE.

ALBERT CORNELIS HOFSTEE, OF THE HAGUE, NETHERLANDS.

APPARATUS FOR MACHINING POLYGONAL PARTS ON ORDINARY LATHES.

Application filed March 12, 1925, Serial No. 15,098, and in the Netherlands March 25, 1924.

The invention relates to an apparatus for machining on an ordinary lathe polygonal articles such as bolt-heads, nuts, collars, and the like, after such articles have been cylindrically turned beforehand on the lathe to a diameter equal to or exceeding that of the circumscribed circle of the polygon.

The apparatus according to the invention comprises a clamping member in which the piece of work may be so clamped that its longitudinal axis perpendicularly intersects the axis of the centres of the lathe, said axis constituting the axis of rotation of the clamping device.

According to the invention which departs from an apparatus of the type above referred to the rotation of the clamping member about the axis of the piece of work to be machined, is derived from the same member which causes the clamping device to rotate as a whole about the axis of the centres, means being provided for automatically effecting a periodical rotation of the clamping device about its own longitudinal axis for a part of a complete revolution, during a single revolution of the clamping device about the axis of the centres.

According to the invention the clamping device is rotatable about the axis of the article clamped therein, and about the axis of centres of the lathe in such a manner, that the clamping device during each complete revolution about the last mentioned axis performs a rotation about the axis of the piece of work for a predetermined part of a revolution, such rotation being completed during a part of the revolution about the axis of the centres of the lathe. The periodical rotation of the clamping device about the axis of the piece of work may be effected by means of a Geneva stop or a similar device having the same function, in such a way that during that part of the revolution of the pin, in which the stop is not acted upon by the pin, a rotation of the Geneva stop and therefore of the piece of work about its axis is prevented. Preferably the rotation of the axis of the centre of the lathe is transmitted to the continuously rotating part of the Geneva stop device by means of a set of bevel gears having a gear ratio dependent on the number of faces of the article to be machined.

The invention moreover provides for a device through the medium of which the bevel gear, the axis of which is in line with the axis of the centres, is prevented from rotating.

In order that the invention will be more readily understood it is hereinafter described with reference to the accompanying drawing illustrating one way of carrying the invention into effect.

Fig. 1 shows a sectional plan view of the apparatus clamped between the jaws of the chuck of a lathe and in the position, in which after the piece of work has passed the tool, the chuck has further rotated through an angle of 180°, the direction of rotation being so assumed, that the upper part of the chuck moves towards the operator.

Figure 2 shows the device for locking the bevel gear, the axis of which is in line with that of the centres of the lathe.

Figure 3 is a sectional view taken on the line III—III in Figure 1.

The apparatus shown in the drawing comprises a frame 1 adapted to be clamped between the jaws of the chuck 2 of a lathe so that the axis of the bevel gear 3 hereinafter referred to, coincides with that of the centres of the lathe. The frame 1 carries a hollow shaft or sleeve 4 widened at one end to receive a clamping device as usually found in the head of a turret lathe, centering drill-chucks or like members, such clamping device comprising a friction grip 5 having slots at the ends for producing a spring action when clamped between a conical shoulder within the sleeve 4 and a conical part on the inner face of a pressure screw 6 screwed into the widened end of the sleeve 4. By means of this clamping device the piece of work e. g. the bolt 7 shown in dotted lines may be fixedly secured in the sleeve 4.

The sleeve 4 further carries a Geneva stop device 8 secured thereto and for the greater part enclosed in a slot 9 of the frame 1. This Geneva stop is adapted to co-operate with a pin 10 secured in a plate 11 carried by a crescent-shaped locking-member 12 secured to a shaft 13 which is journalled in a sleeve 14 mounted in the frame 1 in such a manner that the axes of the shaft 13 and of the sleeve 4 are parallel. Between two adjacent slots of the Geneva stop the body thereof is cut away in the form of an arc in such a manner that recesses $8^a$, $8^b$ . . . are formed, with the same radius as the convex part of the locking member 12, which is to enter said recesses for locking the Geneva stop after each periodical rotation thereof.

The sleeve 14 which preferably is made of bronze, is secured in the frame 1 by means of a fine screw thread, the bore for the shaft 13 being somewhat eccentric so that for compensating any wear of the parts due to which the locking member 12 would have too much lost motion in the recesses of the Geneva stop, the axes of the parts 13 and 4 by a small angular adjustment of the sleeve 14, may be brought nearer to one another. After the sleeve 14 has been adjusted it is locked by means of an annular locking nut 15.

The end of the shaft 13 remote from the locking member 12 carries a bevel gear 16 secured thereto such bevel gear being in mesh with the bevel gear 3 before mentioned, the latter being secured to a shaft 17 the axis of which in the operative position of the apparatus, is in line with the axis of the centres of the lathe. The shaft 17 is mounted in a sleeve 18 (not eccentric) which is threaded in the frame 1 and in the exact position is locked by means of a locking nut 19.

The eccentricity of the shaft 13 in the sleeve 14 is so designed that a small angular displacement of the sleeve causes only a very little displacement of the shaft in a plane at right angles to the drawing so that the small adjustment which is effected thereby in the contact of the teeth of the two bevel gears 16 and 3 may be neglected.

The hollow spindle 20 of the lathe is further provided with a rod 21 carrying a hook 22 engaging an eyelet 23 on the shaft 17 and also a disc 24 (Fig. 2) freely movable within the hollow spindle of the lathe. The rod 21 outside the hollow spindle 20 carries a stop member or carrier 25 secured thereto and serves to prevent the rod 21 the shaft 17 and the bevel gear 3 from rotating. For this reason the stop member 25 with the bent part rests against a stationary part of the lathe. The rod 21 is secured to the stop member 25 in such a position that when the apparatus is in the position shown in Fig. 1 representing the position in which the work piece (upper position in the drawing) is not in contact with the tool; the pin 10 engages one of the slots of the Geneva stop as shown in Fig. 1.

The drawing moreover shows the tool 26 which is clamped in an ordinary support and is movable in a direction of the arrows $c, d$.

The operation of the device is as follows:

During the rotation of the apparatus about the axis of the centres of the lathe the bevel gear 3 remains stationary. The bevel gear 16 therefore rolls on the bevel gear 3 in the manner of a planet wheel. As in this case both gears have the same number of teeth the shaft 13 during one revolution of the complete apparatus will have completed one revolution in the sleeve 14, so that the pin 10 has entered the next slot of the Geneva stop 8. As in the embodiment shown the Geneva stop is provided with 6 slots it will be understood that during each revolution of the shaft 13 the axis of the piece of work 7 is rotated through 1/6th of a revolution which will take place each time after the head of the piece of work is removed from the tool, whereas when the head is in contact with the tool the Geneva stop is locked due to the fact that the convex part of the locking member 12 which rotates in the direction of the arrow enters one of the recesses $8^a$, $8^b$ etc. of the Geneva stop. At one revolution only one cut is taken from one of the sides to be machined so that, presuming the apparatus is arranged for hexagonal forms, after 6 revolutions of the apparatus about the axis of the lathe, all sides of the piece of work has been submitted to a single cut. Consequently all sides are machined in the same way.

By advancing the tool 26 in the direction of the arrow $c$ the polygonal head of the piece of work may be turned to the desired circumferential size whereas by advancing the tool in the direction of the arrow $d$ the bolt head may be machined over its complete height. In order to enable the clamping member to receive bolts of considerable length the sleeve 4 is open on both sides. For adapting the device to hold bolts of varying diameter there are provided with the apparatus a plurality of spring grips 5 having the same outer dimensions, the bore of the grips however being different in the same manner as is the case with the removable grips of turret lathes. The removal of the grips may take place after unscrewing the screw 6.

According to the embodiment shown the apparatus is designed for machining articles with 6 faces. It will be understood that by replacing the Geneva stop with 6 slots by a similar stop having a different number of slots, (if necessary with simultaneous replacement of the locking member in case the relative relation of the diameter should be altered), the apparatus may be adapted for machining articles with more than 6 faces. Normally the apparatus is only designed for bolt heads which usually occur in practice and is therefore only provided with Geneva stop devices of 4, 6 and 8 slots.

When the apparatus is designed for octagonal pieces of work and therefore is provided with a Geneva stop comprising 8 slots it is possible to manufacture with the same device articles with half the number of faces by using a gear ratio between the bevel gears 16 and 3 of 1 : 2, so that during a single revolution of the jaw chuck the locking member 12 rotates twice, and by so adjusting the position of the stop member on the rod 21 that after the piece of work has passed the tool the hollow spindle is twice rotated before the head of the work again comes in front of the tool.

This rotation will therefore have to take place when the head of the work is in its lowest and its uppermost position in other words when the frame 1 is directed downwards and upwards.

In manufacturing polygonal nuts the blank may be screwed on a threaded rod which is clamped in the sleeve 4 of the Geneva stop the nut being held in position on the rod by a locking nut.

When a nut and the corresponding locking nut for a bolt have to be made simultaneously, both blanks are secured to a threaded shaft and are rigidly clamped together, whereupon the nuts are machined as one body in the manner described.

When the bolt for these nuts is of sufficient length to be inserted into the sleeve 4 from the other side, it is not necessary to make a special shaft for these nuts but in this case the bolt itself may serve. One of the advantages obtained with the apparatus according to the invention, is that with one and the same apparatus polygonal articles of arbitrary dimensions may be produced.

A further advantage obtained is this that the axis of the bolt spindle exactly coincides with the axis of the bolt head to be turned.

Moreover each labourer accustomed to ordinary lathes is able to work with the device above described. It is further not necessary to mark off the hexagon on the blank beforehand.

In comparison with other methods the following advantages are obtained.

The manufacture of nuts by milling or planing takes up considerable time as also the turning over of the bolts or nuts when a distribution member is not provided.

For wholesale manufacture of bolts and nuts it is of course advantageous to use hexagonal or octagonal steel. However when machined bolt heads and nuts are desired the bolts and nuts obtained in this way may be readily and exactly machined by employing the apparatus according to the invention.

In workshops, where nuts and bolts of divergent dimensions are frequently required, it is not remunerative to take in stock for each of the sizes which may occur, hexagonal or octagonal steel of the desired dimensions and in this case I have found it preferable to manufacture the bolt or nut in the manner described from arbitrary material which happens to be in stock.

The principle on which the invention is based, does not alter when using instead of a Geneva stop with 6 slots, a stop having a different number of slots.

The repeated turning over of the blank, as is herein effected by the Geneva stop could also be realized by any other suitable mechanism, e. g. a ratchet and ratchet wheel.

As an alternative embodiment of my invention the apparatus could be so designed that the clamping device is held stationary whereas the tool is rotated.

It will be understood that the methods above described do not depart from the scope of the invention as set forth in the specification.

What I claim is:

1. An apparatus for machining polygonal articles on an ordinary lathe comprising a work clamping device adapted to be rotated by a lathe spindle and to clamp the work in a position with its longitudinal axis perpendicularly intersecting the axis of rotation of the spindle, said clamping device being mounted to rotate with the work about the axis of the latter, and means for rotating the clamping device about the work axis in response to its rotation with the spindle about the lathe axis.

2. An apparatus for machining polygonal articles on an ordinary lathe comprising a work clamping device adapted to be rotated by a lathe spindle and to clamp the work in a position with its longitudinal axis perpendicularly intersecting the axis of rotation of the spindle, said clamping device being mounted to rotate with the work about the axis of the latter, and means for rotating the clamping device about the work axis in response to its rotation with the spindle about the spindle axis, the last mentioned means acting to automatically effect a periodical rotation of said clamping device about the work axis through a part of a complete revolution, during one revolution of the clamping device about the spindle axis.

3. An apparatus for machining polygonal articles on an ordinary lathe comprising a work clamping device adapted to be rotated by a lathe spindle and to clamp the work in a position with its longitudinal axis perpendicularly intersecting the axis of rotation of the spindle, said clamping device being mounted to rotate with the work about the axis of the latter, and means for intermittently effecting movement of the clamping device about the work axis in response to its rotation with the spindle about the spindle axis, the last mentioned means acting during the intervals of rest of the clamping device in its rotation about the work axis to prevent rotary motion of the latter and the work.

4. An apparatus for machining polygonal articles on an ordinary lathe comprising a work clamping device adapted to be rotated by a lathe spindle and to clamp the work in a position with its longitudinal axis perpendicularly intersecting the axis of rotation of the spindle, said clamping device being mounted to rotate with the work about the axis of the latter, and means for intermittently effecting movement of the clamping device about the work axis in response to its rotation with the spindle about the spindle axis, the last mentioned means acting during the intervals of rest of the clamping device in its rotation about the work axis to prevent rotary motion of the latter and the work, whereas to counteract the tendency of the tool to move the work.

5. An apparatus for machining polygonal articles on an ordinary lathe comprising a work clamping device adapted to be rotated by a lathe spindle and to clamp the work in a position with its longitudinal axis perpendicularly intersecting the axis of rotation of the spindle, said clamping device being mounted to rotate with the work about the axis of the latter, and means for rotating the clamping device about the work axis in response to its rotation with the spindle about the spindle axis, the last mentioned means acting to automatically effect a periodical rotation of said clamping device about the work axis through a part of a complete revolution, during one revolution of the clamping device about the spindle axis. and said last mentioned means including gear wheels having a gear ratio calculated in accordance with the number of faces to be machined on the work.

6. An apparatus for machining polygonal articles on an ordinary lathe comprising a work clamping device adapted to be rotated by a lathe spindle and to clamp the work in a position with its longitudinal axis perpendicularly intersecting the axis of rotation of the spindle, said clamping device being mounted to rotate with the work about the axis of the latter, and means for rotating the clamping device about the work axis in response to its rotation with the spindle about the spindle axis, the last mentioned means acting to automatically effect a periodical rotation of said clamping device about the work axis through a part of a complete revolution, during one revolution of the clamping device about the spindle axis, and said last mentioned means including gear wheels having a gear ratio calculated in accordance with the number of faces to be machined on the work, and means securing one of the gear wheels against rotation.

In testimony whereof I affix my signature.

ALBERT CORNELIS HOFSTEE.